(12) United States Patent
Hüttermann et al.

(10) Patent No.: US 6,484,441 B1
(45) Date of Patent: Nov. 26, 2002

(54) METHOD FOR INCREASING THE PH VALUE IN ACIDIC SOIL

(75) Inventors: Aloys Hüttermann, Göttingen (DE); Moitoba Zomorrodi, Göttingen (DE)

(73) Assignee: Stockhausen GmbH, Krefeld (DE)

( * ) Notice: Subject to any disclaimer, the term of this patent is extended or adjusted under 35 U.S.C. 154(b) by 0 days.

(21) Appl. No.: 09/647,107

(22) PCT Filed: Mar. 24, 1999

(86) PCT No.: PCT/EP99/02009

§ 371 (c)(1),
(2), (4) Date: Dec. 11, 2000

(87) PCT Pub. No.: WO99/48998

PCT Pub. Date: Sep. 30, 1999

(30) Foreign Application Priority Data

Mar. 26, 1998 (DE) .......................... 198 13 423

(51) Int. Cl.[7] .............................. C09K 17/22
(52) U.S. Cl. ................................. 47/58.1 R
(58) Field of Search ............................. 47/9, 58.1

(56) References Cited

U.S. PATENT DOCUMENTS

| 3,713,253 | A | * | 1/1973 | Urban | 47/58 |
| 5,645,730 | A | * | 7/1997 | Malachosky et al. | 210/665 |
| 5,679,364 | A | * | 10/1997 | Levy | 424/405 |
| 5,707,912 | A | * | 1/1998 | Lowe et al. | 501/147 |
| 5,927,003 | A | * | 7/1999 | Miller et al. | 47/58 |
| 5,939,086 | A | * | 8/1999 | Levy | 424/405 |

FOREIGN PATENT DOCUMENTS

| JP | 61195186 A | * | 8/1986 | 71/903 |
| JP | 04161484 A | * | 6/1992 | 405/263 |
| JP | 08253937 A | * | 10/1996 | |

* cited by examiner

Primary Examiner—Peter M. Poon
Assistant Examiner—Bethany L Griles
(74) Attorney, Agent, or Firm—Cohen, Pontani, Lieberman & Pavane

(57) ABSTRACT

In a method for raising the pH in acidic soils, said acidic soils are treated with crosslinked polyacrylates or polymethacrylates.

18 Claims, 2 Drawing Sheets

NEEDLES OF SPRUCE PLANTS OF EXAMPLE 4

METHOD FOR INCREASING THE PH VALUE IN ACIDIC SOIL

FIELD OF THE INVENTION

The present invention relates to a method for raising the pH in acidic soils, especially in soils having a pH in the aluminum buffer range, i.e. less than 4.2. The aluminum buffer range is the pH range in which aluminum from the weathering of clay minerals, which is present as oxide or hydroxide, i.e. in nonionic form, at higher pH, passes into cationic solution.

BACKGROUND OF THE INVENTION

To raise the pH such soils have hitherto been treated with lime, for example by sprinkling on or mixing into the soil. Existing stands were limed with about 3 t per ha every five years to stop further acidification. In the case of first afforestations, the recommended liming quantities are appreciably higher, up to 15 t per ha, depending on soil acidification, because of the higher acid sensitivity of the young plants. Since, owing to the now appreciably decreased acid emissions, significant further acidification of soils is no longer likely, liming will in future no longer have such immense importance in the case of mature stands. However, the mortality problem of afforestations on problem sites will continue, since the acid in the soils is not so quickly neutralized.

Attempts have been made to improve soil quality by mixing alkaline sandy and loamy soils with poly(meth) acrylates (Arid-Soil-Research-and-Rehabilitation, 1996, 10; 3, 277–285). The pH was observed to rise. This effect of pH being raised, which is actually undesirable in alkaline soils, can be explained by the bonding of protons to the acrylate, releasing metal cations, such as potassium, from the acrylate.

The situation is different in acidic soils. Soil suspensions in pure water have a pH some 0.6 units higher than a suspension in $CaCl_2$ solution. This is because, in such soils, the exchange sites on the clay-humus complex are mostly occupied by protons and cationic acids and the pH of the soil solution is very slow to become established, i.e. equilibration is very slow between the clay-humus complexes of the soil and the soil solution (see: "Bodenökologie", Georg Thieme Verlag Stuttgart 1997, p. 125). On adding KCl or $CaCl_2$ to a soil suspension, the counterions on the exchanger complex are immediately released and the pH correspondingly lowered.

SUMMARY OF THE INVENTION

When the method of the invention is used to add poly (meth)acrylates to an acidic soil, the protons in the soil solution are trapped by the negatively charged carboxyl groups of the poly(meth)acrylates, so that a higher pH becomes established in the soil solution. This effect persists for a prolonged period, surprisingly for a period of many months. This could not be foreseen by one skilled in the art and permits a long-term raising of the pH of acidic soils.

Figure 1:
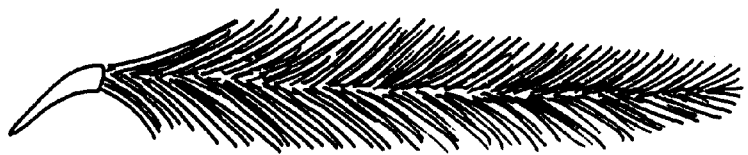
FIG. 1 shows the needles of spruce plants of Example 4.
Top: spruce on untreated soil;
Bottom: spruce on soil containing 0.6% of Stockosorb®
Figure 1:
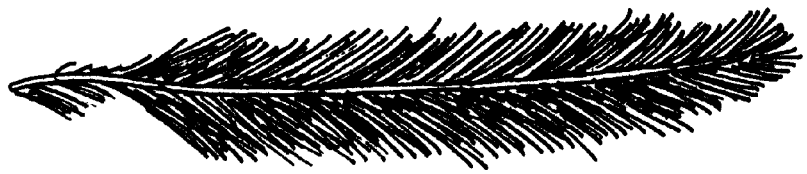

The acidic soils are treated with crosslinked poly(meth) acrylates, for example by sprinkling on or preferably by mixing in. In the case of mixing, amounts of 0.1% to 2.5%, based on the total soil mass, are used, preferably about 0.5 to 2.0% by weight, particularly preferably about 0.2 to 0.8% by weight, for example 0.4%. The soil is excavated down to a depth of about 50 cm, preferably 30 cm, especially about 40 cm, and mixed with the poly(meth)-acrylates.

Useful poly(meth)acrylates for this invention include all crosslinked poly(meth)acrylates containing carboxylate groups and capable of forming hydrogels.

Carboxylato-containing poly(meth)acrylates useful for the invention are in particular carboxylato-containing poly (meth)acrylates primarily and preferably formed from the monomers acrylic acid, acrylamide, methacrylic acid and methacrylamide, but also from other water-soluble monomers, such as acrylonitrile, methacrylonitrile, N,N-dimethyl-acrylamide, vinylpyridine and also further water-soluble acids and salts thereof capable of addition polymerization, especially maleic acid, fumaric acid, itaconic acid, vinylsulfonic acid or acrylamidomethylpropane-sulfonic acid; further hydroxyl-containing esters of acids capable of addition polymerization, especially the hydroxyethyl and hydroxypropyl esters of acrylic acid and of methacrylic acid; also amino-containing and ammonium-containing esters and amides of acids capable of addition polymerization such as the dialkylamino esters, especially the dimethyl- and the diethyl-aminoalkyl esters of acrylic acid and of methacrylic acid, and also the trimethyl- and trimethyl-ammoniumalkyl esters and also the corresponding amides. The poly(meth)acrylates to be used according to the invention can be formed exclusively from the aforementioned carboxylato-containing monomers or else be combined with carboxylato-devoid monomers in a copolymer. In copolymers, the fraction of carboxylate monomer is 90 to 10 mol %, preferably 60 to 30 mol %.

The above monomers may additionally be copolymerized with small amounts of minimally or completely water-insoluble monomers such as, for example, vinyl esters and the esters of acrylic and/or methacrylic acid with $C_1$–$C_{10}$-alcohols, styrene and alkylated sytrenes. Generally the fraction of water-soluble monomer is 80 to 100% by weight, based on total monomer. The water-insoluble (hydrophobic) monomers generally account for 0 to 20% by weight of the monomer.

The acidic monomer constituents can be neutralized prior to the polymerization, in which case the degree of neutralization is preferably between 10 and 95 mol %, especially between 50 and 90 mol %, and also especially between 70 and 95 mol %. Useful bases for the neutralization include all common organic and inorganic compounds, particular preference being given to aqueous sodium hydroxide solution, aqueous potassium hydroxide solution and ammonia (ammonium hydroxide).

Together with the above-mentioned monomers, small fractions of crosslinking monomers having more than one reactive group in the molecule are copolymerized. This gives rise to partially crosslinked addition polymers which are no longer soluble in water only swellable. Examples of crosslinking monomers are bi- or highly functional monomers, for example amides such as methylenebisacrylamide, methylenebismethacrylamide or ethylenebisacrylamide, also allyl compounds such as allyl (meth)acrylate, alkoxylated allyl (meth)acrylate with preferably 1 to 30 mol of ethylene oxide, triallyl cyanurate, diallyl maleate, polyallyl esters, tetraallyloxyethane, triallylamine, tetraallylethylene-diamine, allyl esters of phosphoric or phosphorous acid, also crosslinking-capable monomers, such as N-methylol compounds of amides such as methacrylamide or acrylamide and the ethers derived therefrom and also esters of polyols and alkoxylated polyols, such as diacrylates or triacrylates, for example butanediol diacrylate or ethylene glycol diacrylate, polyglycol di(meth) acrylates, trimethylolpropane triacrylate, di- and triacrylate esters of trimethylolpropane alkoxylated (ethoxylated) preferably with 1 to 30 mol of alkylene oxide, acrylate and methacrylate esters of glycerol and pentaerythritol, and also of the ethoxylation products of glycerol and pentaerythritol with preferably 1 to 30 mol of ethylene oxide. Preference is given to using methylenebis(meth)acrylamide, ethylenebis (meth)acrylamide, N-methylolacrylamides and triallylamine. The fraction of crosslinking comonomer is 0.01 to 2.5% by weight, preferably 0.01 to 1.0% by weight, particularly preferably 0.01 to 0.1% by weight, based on total monomer.

The carboxylato-containing polymers to be used according to the invention may contain water-soluble polymers as grafting base, in which case amounts up to 30% by weight are preferred. They include, inter alia, partially or completely hydrolyzed polyvinyl alcohols, starch or starch derivatives, lignin or lignin derivatives, cellulose or cellulose derivatives, polyacrylic acids, polyglycols or mixtures thereof.

In a preferred embodiment, the polymers to be used according to the invention have been postcrosslinked. Postcrosslinking, which leads to a distinct improvement in gel stability, absorption under load and absorption rate, is effected using compounds which generally possess at least two functional groups and which are capable of crosslinking the functional groups of the polymer at the surface of the polymer particles. Preference is given to alcohol, amine, aldehyde, glycidyl and epichloro functions, and crosslinker molecules used may also contain a plurality of different functions. Useful postcrosslinking agents include for example ethylene glycol, diethylene glycol, triethylene glycol, polyethylene glycol, glycerol, polyglycerol, propylene glycol, diethanolamine, triethanolamine, polypropylene oxide, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate and polyepoxides such as, for example, ethylene glycol diglycidyl ether. Preference is given to using ethylene carbonate as postcrosslinking agent. The postcrosslinking agent is used in an amount of 0.01 to 10 percent by weight, preferably 0.1–5 percent by weight, particularly preferably 0.1–1 percent by weight, based on the polymer to be post-crosslinked.

The poly(meth)acrylates to be used according to the invention can be prepared by customary methods, preferably by polymerization in aqueous solution batchwise in a polymerization vessel or continuously, for example on an endless belt. The polymerization is started using customary initiators or redox systems for starting a free radical polymerization. A virtually adiabatic course of the polymerization produces an aqueous polymer gel from a corresponding initial concentration of 15 to 50% by weight for the monomer. Stockosorb® and Favor® are trademarks of commercial products available from assignee Stockhausen GmbH & Co. KG, 25 Bäkerpfad, 47805 Krefeld, Germany. By choosing the initial monomer concentration and the corresponding low starting temperature in the range from 0 to 50° C., preferably from 5 to 25° C., the polymerization can be conducted in such a way that the maximum temperature in the aqueous polymer gel being formed is efficiently manageable. After the polymerization has ended, the polymer gel is mechanically comminuted, dried, ground and optionally subjected to surface crosslinking.

Another useful way of preparing the poly(meth)acrylates is the suspension polymerization process in which the discrete polymer particles are formed in the course of the polymerization.

With regard to the addition of surface postcrosslinkers, care must be taken to ensure that the polymer particles are thoroughly mixed. Suitable mixing assemblies for applying the postcrosslinking agent include for example Patterson-Kelley mixers, DRAIS turbulence mixers, Lödige mixers, Ruberg mixers, screw mixers, plate mixers and fluidized bed mixers and continuous upright mixers in which the powder is mixed by means of fast rotating blades (Schugi mixers). After the postcrosslinker, preferably in the form of a solution, has been mixed with the polymer particles, the temperature is raised to 80 to 250° C., preferably to 135 to 250° C., particularly preferably to 150 to 200° C., to carry out the postcrosslinking reaction. The optimum duration of heating to raise the temperature can be easily determined for the individual crosslinking types in a few experiments. The possible duration for the heating to raise the temperature is limited by the point at which the performance profile desired for the superabsorbent is destroyed again as a consequence of heat damage. By way of example, the crosslinking times for temperatures of 180° C. are usually below 30 minutes.

The poly(meth)acrylates can further include processing and conditioning assistants such as, for example, potassium stearate, polyglycol, silicas, bentonites.

The residual monomer content of the poly(meth)acrylates to be used according to the invention is low and less than 1000 ppm, preferably less than 500 ppm, particularly preferably less than 250 ppm. More particularly, the residual level of ecotoxicologically implicated monomers such as acrylamide is preferably below 250 ppm.

The absorption capacity for water and aqueous solutions of the poly(meth)acrylates to be used according to the invention can vary within wide limits and is determined by the monomer constituents, the crosslinkers and optionally the postcrosslinkers. Preference is given to using such poly(meth)acrylates as absorb more than 30 g/g, preferably more than 50 g/g, particularly preferably more than 65 g/g, of a synthetic soil solution having a conductivity of 2.5 $\mu$S. The synthetic soil solution contains per 10 l of water 0.71 g of NaCl, 0.065 g of NaN$_3$, 1.676 g of KCl, 0.353 of NH$_4$Cl, 3.363 g of MgCl$_2$ 6H$_2$O, 10.5 g of CaCl$_2$ 2H$_2$O and 0.019 g of FeCl$_3$ 6H$_2$O. 1 g of poly(meth)acrylate is stirred in 200 ml of this solution for 15 min using a magnetic stirrer, allowed to stand for 45 min and then filtered through a 100 mesh sieve. The ratio of the absorbed amount of liquid and the polymer weight is the absorption value.

Poly(meth)acrylate copolymers prepared using carboxylato-free comonomers, especially acrylamide, possess an absorption of higher long-term stability to frequently changing moist and dry phases during use.

The soluble fractions of the poly(meth)acrylates to be used according to the invention are customarily below 20% by weight, preferably below 15% by weight, very particularly preferably below 10% by weight.

The particle size distribution of the polymers to be used can vary with the end use; it is usually in the range from 0.2 to 3 mm.

Furthermore, the poly(meth)acrylates can be loaded with active compounds which they release back to the environment in delayed fashion in the course of the use according to the invention. These active compounds include, inter alia, fertilizers, herbicides and pesticides.

The method of the invention makes it possible to raise the pH of acidic soils by up to one unit in general. For example, the addition of 0.4% by weight of copolymer to a soil having a pH of 4.11 will raise the pH to 4.69.

The examples hereinbelow illustrate the invention.

EXAMPLE 1

336 g of forest soil (dry weight 300 g) are suspended in 1.2 l of bidistilled water and admixed with 1.2 g each of the following polyacrylates:

Stockosorb® K 400 crosslinked acrylamide/acrylic acid copolymer, partially neutralized as potassium salt, particle size in the range from 200 to 1000 $\mu$m Stockosorb® K 410 crosslinked acrylamide/acrylic acid copolymer, partially neutralized as potassium salt, particle size in the range from 1000 to 3000 $\mu$m Favor® SXM 75 postcrosslinked polyacrylic acid, partially neutralized as sodium salt, particle size in the range from 200 to 800 $\mu$m 50 min after the addition of the polymer the pH is measured using a glass electrode. The following values are obtained:

| Control | pH | 4.13 |
|---|---|---|
| Stocksorb ® K 400 | pH | 4.83 |
| Stocksorb ® K 410 | pH | 4.98 |
| Favor ® SXM 75 | pH | 6.06 |

Compared with untreated forest soil, therefore, the pH is raised by about 1 to 2 units by the addition of polymer.

EXAMPLE 2

4 kg (dry weight) samples each of forest soil (from the Soiling region close to the land of the Göttingen Forest Ecosystem Research Center) and loamy soil (taken from the forest-botanical garden in Göttingen) are mixed with different amounts of Stockosorb®, transferred into a 6 l plastic container and stored outdoors at summer temperatures. After 2 days, 3 5-g samples are taken and the pH is measured using a glass electrode. Subsequently a spatula tip of KCl is added and the pH is remeasured. The following results are obtained:

| | pH value | |
|---|---|---|
| Soil | without KCl | with KCl |
| Loamy soil: | | |
| Control | 7.78 | 7.52 |
| 0.2% of Stockosorb | 7.64 | 7.50 |
| 0.4% of Stockosorb | 7.65 | 7.44 |
| 0.6% of Stockosorb | 7.59 | 7.50 |
| Acidic forest soil: | | |
| Control | 4.09 | 3.45 |
| 0.2% of Stockosorb | 4.49 | 3.53 |
| 0.4% of Stockosorb | 4.58 | 3.51 |
| 0.6% of Stockosorb | 4.67 | 3.56 |

Whereas in the case of soils having a pH around neutral, the Stockosorb quantities used here did not produce any pH effect, the pH in the acidic soil rose by up to 0.6 units.

EXAMPLE 3

Forest soil was mixed with Stockosorb® K 400 and K 410 as in Example 2 using amounts of 0.1 to 1.0% by weight, based on the soil quantity. After 10 days the pH was measured on Nov. 16, 1995. A second measurement took place about 6 months later on Jun. 4, 1996. The following results were obtained:

| Polymer content of soil (% by weight) | Date measured: | | | |
|---|---|---|---|---|
| | November 16, 1995 | | June 4, 1996 | |
| | in water | addition of KCl | in water | addition of KCl |
| 0 (control) | 4.11 | 3.43 | 4.05 | 3.49 |
| K 400 | | | | |
| 0.1 | 4.34 | 3.46 | 4.11 | 3.39 |
| 0.2 | 4.54 | 3.56 | 4.31 | 3.49 |
| 0.3 | 4.54 | 3.48 | 4.26 | 3.46 |
| 0.4 | 4.69 | 3.50 | 4.36 | 3.50 |
| 0.5 | 4.77 | 3.63 | 4.46 | 3.37 |
| 0.6 | 4.69 | 3.58 | 4.80 | 3.60 |
| 0.7 | 4.77 | 3.61 | 4.76 | 3.61 |
| 0.8 | 4.75 | 3.54 | 4.71 | 3.53 |
| 0.9 | 4.75 | 3.54 | 4.70 | 3.50 |
| 1.0 | 4.87 | 3.53 | 4.65 | 3.44 |
| K 410 | | | | |
| 0.1 | 4.39 | 3.48 | 4.19 | 3.48 |
| 0.5 | 4.58 | 3.51 | 4.64 | 3.62 |
| 1.0 | 5.12 | 3.82 | 5.08 | 3.73 |

Even after the very severe winter of 1995/96, when temperatures of −20° C. and lower were reached in Göttingen, the pH of the soil was still substantially elevated in the subsequent vegetation period, depending on the amount of hydrogel added.

EXAMPLE 4

Three-year-old spruce plants were planted in 12 l containers into an acidified loamy slate soil from the Harz region which had been mixed with 0.6% of Stockosorb K 400. Controls were concurrently planted in untreated soil. The plants were kept outdoors from May to October while being irrigated with tap water as usual. It was observed during this period that the needles of the plants growing in untreated soil turned yellow, while the plants growing in the Stockosorb-containing soil continued to have green needles (FIG. 1).

The plants were then exposed to a water stress treatment, i.e. deprived of irrigation water until the needles turned gray and dropped off.

Figure 2A:
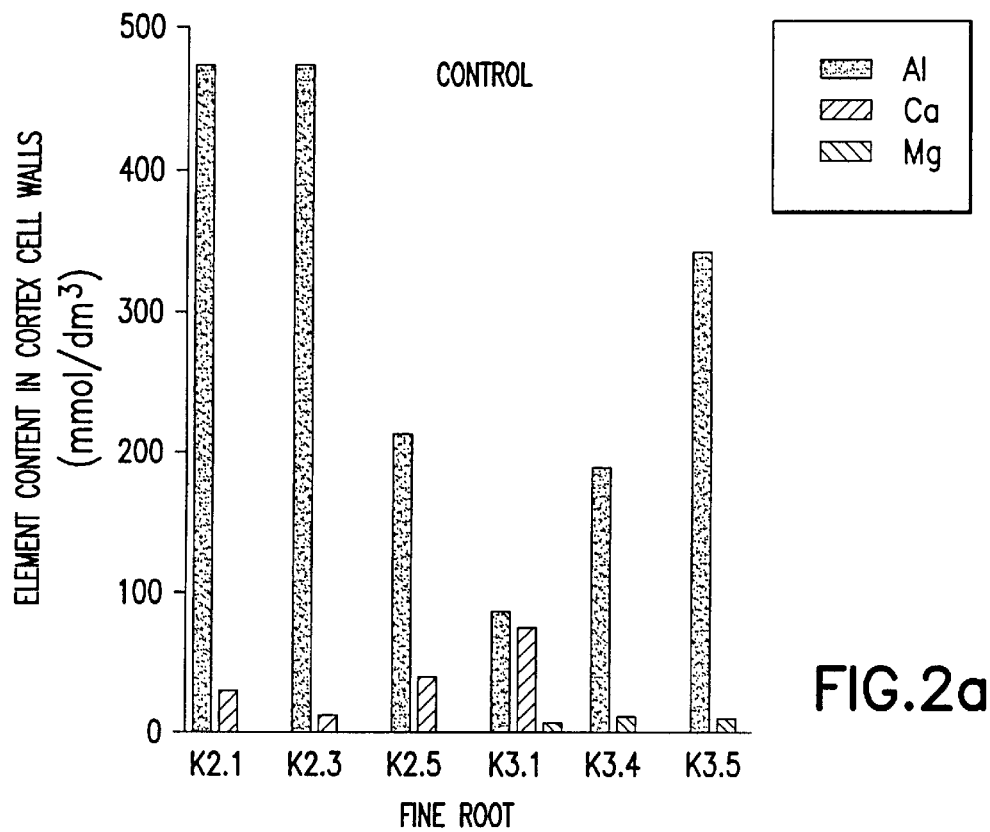
FIGS. 2a and 2b show the element content in cortex cell walls of roots of spruce plants treated in accordance with Example 4.
Figure 2B:
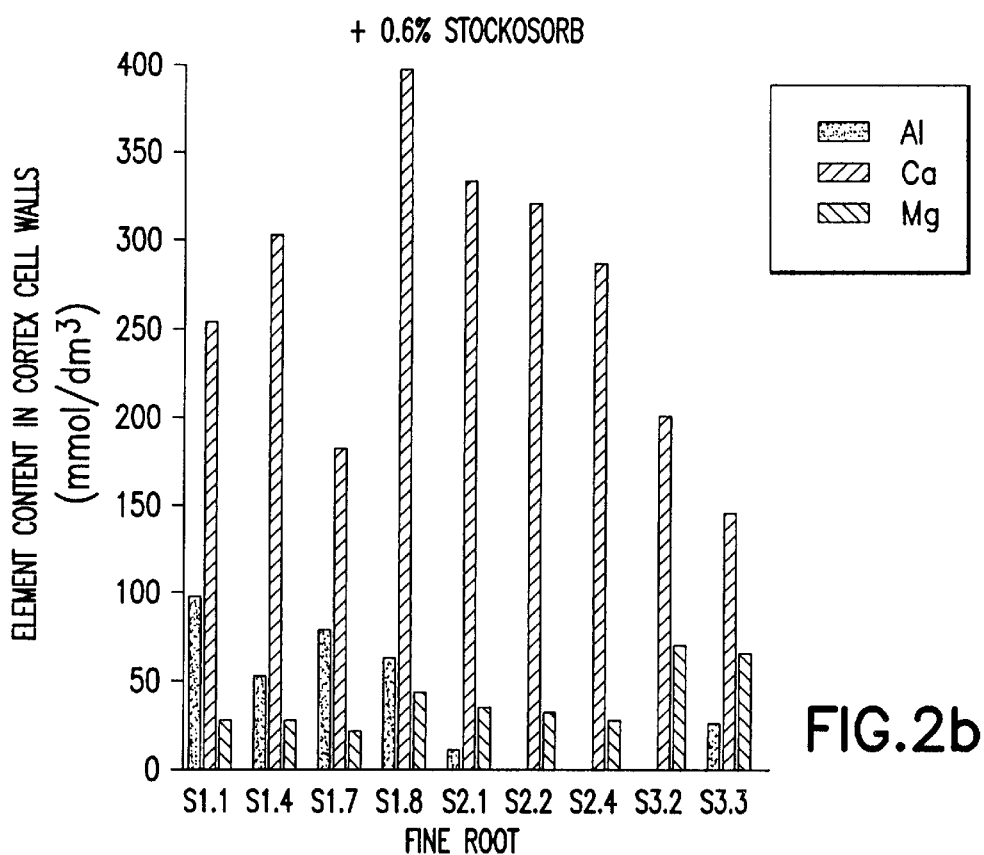

Depending on the treatment variant, the rootlets were taken from three different plants in each case and prepared for ion localization in an electron microscope with x-ray microanalysis (Godbold, D. L., E. Fritz, A. Hüttermann: Aluminum toxicity and forest decline. Proc. Natl. Acad. Sci. USA 85,3888–3892 (1988)). The analyses of the element contents of the cell walls of the root cortex in mmol/dm$^3$ of various roots are reproduced in FIG. 2. The roots which grew in the untreated soils contained large quantities of aluminum and only very small quantities of the important nutritional element calcium and virtually no magnesium (FIG. 2a,control). The situation was exactly the reverse in the cell walls of the root cortices of the plants growing in the Stockosorb-treated soils in that they contained only little aluminum but a lot of calcium and in every case also magnesium (FIG. 2b, 0.6% of Stockosorb).

Even under the conditions of soil drying which are very difficult for the plant because the concentration of the ions in the nutrient solution increases by at least one order of magnitude, the Stockosorb protective colloid was effective. The Stockosorb-treated plants were found to contain substantially fewer aluminum ions and instead substantially higher concentrations of the bivalent nutrient ions calcium and magnesium.

What is claimed is:

1. A method of treating acidic soil with cross-linked polyacrylates or polymethacrylates comprising treating acidic soil with poly(meth)acrylates in the form of poly (meth)acrylic acid and/or methacrylic acid/(meth)acrylate copolymer having a carboxylate fraction in the range of 50–30 mol %, excluding the value of 30 mol %, and wherein the soluble fraction is less than 15% of weight to raise the pH of the acidic soil.

2. The method as claimed in claim 1, wherein said treating of said acidic soil is effected by sprinkling on or by mixing in.

3. The method as claimed in claim 2, wherein the amount of poly(meth)acrylates mixed in is from 0.1 to 2.5% by weight is mixed in.

4. The method as claimed in claim 2, wherein the amount of poly(meth)acrylates mixed in is from 0.5 to 20% by weight.

5. The method as claimed in claim 1, wherein said crosslinked poly(meth)acrylates have been prepared using monoethylenically unsaturated monocarboxylic acids containing carboxylate groups.

6. The method as claimed in claim 1, wherein said poly(meth)acrylates have been prepared using monoethylenically unsaturated monomers containing no carboxylate groups.

7. The method as claimed in claim 5, wherein said poly(meth)acrylates are obtained using methylenebis(meth) acrylamide, ethylenebis(meth)acrylamide, N-methylolacrylamide or triallylamine as crosslinker.

8. The method as claimed claim 5, wherein said poly (meth)acrylates are treated with a postcrosslinker in amounts of 0.01 to 10% by weight at elevated temperature.

9. The method as claimed in claim 5, wherein the acidic monomer constituents of said poly(meth)acrylate have been neutralized to an extent between 10 and 95 mol %.

10. The method as claimed in claim 5, wherein said poly(meth)acrylates have an absorption capacity for synthetic soil solution of more than 30 g/g.

11. The method as claimed in claim 5, wherein said poly(meth)acrylates are incorporated into the acidic soil down to a depth of about 50 cm.

12. The method as claimed in claim 5, wherein said carboxylate group comprises acrylic acid or salts thereof.

13. The method as claimed in claim 6, wherein said monoethylenically unsaturated monomers comprise acrylamide.

14. The method as claimed in claim 7, wherein said crosslinker is methylenebisacrylamide.

15. The method as claimed in claim 8, wherein the temperature is between 80° C. and 250° C.

16. The method as claimed in claim 9, wherein the acidic monomer constituents of said poly(meth)acrylate have been neutralized to an extent between 50 and 90 mol %.

17. The method as claimed in claim 10, wherein the absorption capacity is more than 50 g/g.

18. The method as claimed in claim 10, wherein the absorption capacity is more than 65 g/g.

* * * * *